US012241246B1

(12) United States Patent
Wigboldy

(10) Patent No.: US 12,241,246 B1
(45) Date of Patent: Mar. 4, 2025

(54) TROWEL SEALANT DISPENSING SYSTEM

(71) Applicant: Altenloh, Brinck & Co. US, Inc., Bryan, OH (US)

(72) Inventor: Jason R. Wigboldy, Grand Rapids, MI (US)

(73) Assignee: Altenloh, Brinck & Co. U.S., Inc., Bryan, OH (US)

( * ) Notice: Subject to any disclaimer, the term of this patent is extended or adjusted under 35 U.S.C. 154(b) by 321 days.

(21) Appl. No.: 17/728,354

(22) Filed: Apr. 25, 2022

Related U.S. Application Data

(63) Continuation-in-part of application No. 17/482,509, filed on Sep. 23, 2021, now abandoned.

(60) Provisional application No. 63/222,647, filed on Jul. 16, 2021, provisional application No. 63/179,067, filed on Apr. 23, 2021, provisional application No. 63/148,648, filed on Feb. 12, 2021, provisional application No. 63/089,460, filed on Oct. 8, 2020, provisional application No. 63/082,494, filed on Sep. 24, 2020.

(51) Int. Cl.

| | |
|---|---|
| ***E04B 1/68*** | (2006.01) |
| ***B05C 1/00*** | (2006.01) |
| ***B05C 11/02*** | (2006.01) |
| ***B05C 11/10*** | (2006.01) |
| ***B05C 17/00*** | (2006.01) |
| ***B05C 17/01*** | (2006.01) |

(52) U.S. Cl.
CPC .............. *E04B 1/6801* (2013.01); *B05C 1/00* (2013.01); *B05C 11/028* (2013.01); *B05C 11/10* (2013.01); *B05C 17/002* (2013.01); *B05C 17/01* (2013.01)

(58) Field of Classification Search
CPC ....... E04B 1/6801; B05C 1/00; B05C 11/028; B05C 11/10; B05C 17/002; B05C 17/01; B05C 11/04; B05C 11/045
USPC ................................ 401/261, 263, 265, 266
See application file for complete search history.

(56) References Cited

U.S. PATENT DOCUMENTS

| | | | | |
|---|---|---|---|---|
| 2,804,767 A | | 9/1957 | Schoen | |
| 3,087,654 A | * | 4/1963 | Moore | E04F 21/04 222/105 |
| 3,368,234 A | * | 2/1968 | Edens, Jr. | E04F 21/08 15/235.4 |
| 3,403,960 A | * | 10/1968 | Ballard | E04F 21/08 401/266 |
| 3,997,084 A | | 12/1976 | Davis, Jr. | |
| 4,146,339 A | | 3/1979 | Fleming et al. | |

(Continued)

*Primary Examiner* — David J Walczak
(74) *Attorney, Agent, or Firm* — Gardner, Linn, Burkhart & Ondersma LLP

(57) ABSTRACT

A sealant dispensing system includes a sealant dispensing trowel having a handle and a trowel pad, where the trowel pad includes a trowel surface having an opening thereon through which sealant is configured to flow for applying sealant to a building surface. The trowel pad further includes a concave portion on the trowel surface with the trowel pad including a leading edge and a trailing edge with the concave portion extending to the trailing edge and with the opening on the trowel surface being disposed at the concave portion. In a particular configuration the concave portion is narrower at the opening and wider at the trailing edge, with the trowel surface including a flat portion and the concave portion being recessed relative to the flat portion and having a depth relative to the flat portion that is greater at the trailing edge than at the opening.

19 Claims, 8 Drawing Sheets

(56) References Cited

U.S. PATENT DOCUMENTS

| | | | | |
|---|---|---|---|---|
| 4,570,834 | A * | 2/1986 | Ward | B05C 21/00 401/266 |
| 5,092,508 | A | 3/1992 | Vigil Rio | |
| 5,244,123 | A | 9/1993 | Benedict | |
| 5,249,716 | A | 10/1993 | O'Sullivan | |
| 5,277,511 | A | 1/1994 | Stockton | |
| 5,322,381 | A | 6/1994 | Argo, II | |
| 6,016,937 | A | 1/2000 | Clay | |
| 6,120,203 | A | 9/2000 | Modders | |
| 6,234,795 | B1 | 5/2001 | Fischer | |
| 6,450,723 | B1 | 9/2002 | Lithgow | |
| 6,908,022 | B2 | 6/2005 | Schmitz | |
| 6,981,611 | B2 | 1/2006 | Carruth et al. | |
| 7,963,428 | B2 | 6/2011 | Searle et al. | |
| 8,152,039 | B2 | 4/2012 | Searle et al. | |
| 8,360,672 | B2 | 1/2013 | Stubbs | |
| 8,413,740 | B2 | 4/2013 | Rodenhouse | |
| 8,419,401 | B2 * | 4/2013 | McMahon | E04F 21/165 425/182 |
| 8,430,588 | B2 | 4/2013 | Haack | |
| 8,985,402 | B2 | 3/2015 | Schneider et al. | |
| 9,309,915 | B1 | 4/2016 | Rodenhouse et al. | |
| 9,827,587 | B2 | 11/2017 | Atsebha | |
| 10,307,784 | B2 | 6/2019 | Larrabee et al. | |
| 10,646,894 | B2 | 5/2020 | Kuo et al. | |
| 10,695,791 | B2 | 6/2020 | Atsebha | |
| 10,780,454 | B2 | 9/2020 | Summons et al. | |
| 2006/0013643 | A1 | 1/2006 | Carruth et al. | |
| 2006/0118580 | A1 | 6/2006 | Spencer | |

* cited by examiner

TROWEL SEALANT DISPENSING SYSTEM

CROSS REFERENCE TO RELATED APPLICATIONS

The present application claims priority of U.S. provisional applications Ser. No. 63/179,067 filed on Apr. 23, 2021 and 63/222,647 filed on Jul. 16, 2021, which are hereby incorporated herein by reference in their entireties.

The present application is a continuation-in-part of U.S. application Ser. No. 17/482,509 filed on Sep. 23, 2021, which claims priority benefits of U.S. provisional applications Ser. No. 63/082,494 filed on Sep. 24, 2020, 63/089,460 filed on Oct. 8, 2020, 63/148,648 filed on Feb. 12, 2021, 63/179,067 filed on Apr. 23, 2021, and 63/222,647 filed on Jul. 16, 2021, all of which are hereby incorporated herein by reference in their entireties

FIELD OF THE INVENTION

The present invention relates generally to sealant dispensers and, more particularly, to a sealant dispensing system for use and operation with sealing structural sheathing or insulation, as well as sealing other seams of building materials during construction of residential or commercial buildings.

BACKGROUND OF THE INVENTION

In certain building construction applications it is necessary to apply a layer of sealant to the surfaces of building materials, such as to seal joints or seems at adjacent sheets of building material, or to seal other building surfaces and intersections, such as at corners or penetrations. Such sealant may be applied in a two-step process in which an amount of sealant is initially applied, and then in a second step is shaped over the joint or seam. The operation can be time consuming and labor intensive. In addition, the application of such sealant can be subject to application variations as a result of human error.

SUMMARY OF THE INVENTION

Embodiments of the present invention provide a sealant dispensing system for applying an accurate and controlled amount of sealant, such as over a seam or joint, by way of a handheld trowel that may be supplied sealant from a canister, where the trowel may include a concave portion on a troweling surface configured to control the amount and shape of the sealant being applied.

In one form of the present invention, a sealant dispensing system comprises a sealant dispensing trowel that in turn comprises a handle and a trowel block or pad, where the trowel block includes a trowel surface having an opening thereon through which sealant is configured to flow for applying to a building surface. The trowel block may be separable from the handle. In a particular arrangement, the trowel block includes a concave portion. The trowel block may include a leading edge and a trailing edge, where the concave portion extends to the trailing edge. The trowel block may be configured for applying sealant to a flat surface or to angled surfaces, such as inside or outside corners. A sealant line from a canister may be used to supply sealant to the trowel. In a particular embodiment, the sealant line leads to the handle and flows through a channel in the handle to the trowel pad.

In another embodiment, a sealing dispensing system comprises a sealant dispensing trowel comprising a first handle and a trowel pad, and comprises a caulk gun comprising a second handle and being coupled to the trowel with the caulk gun configured to deliver caulk to the trowel. The trowel pad includes a trowel surface having an opening thereon through which sealant is configured to flow for applying to a building surface. In particular arrangements, the caulk gun is coupled to the trowel by a fitting, where the fitting is moveable whereby the caulk gun is moveable relative to the trowel. In a further particular arrangement a sealant line is disposed between the trowel and the caulk gun. In such an arrangement, the sealant system may comprise a pair of moveable fittings with one of the fittings joined to the caulk gun and the other fitting joined to the trowel with the sealant line being disposed between the fittings.

Thus, the sealant dispensing system enables a consistently sized sealant bead to be quickly and readily applied by an operator to a building surface, such as at the seam of two adjoining building materials. The system provides significant labor savings by simultaneously both applying and "striking" the sealant over the joint in one pass versus two passes in which sealant is initially applied and then shaped. Still further, the system provides material cost savings by reducing waste from over application, and can reduce liability by applying a pre-determined bead to comply with "as-tested" application methods per manufacturer.

These and other objects, advantages, purposes and features of the present invention will become apparent upon review of the following specification in conjunction with the drawings.

DESCRIPTION OF THE PREFERRED EMBODIMENTS

Figure 1:
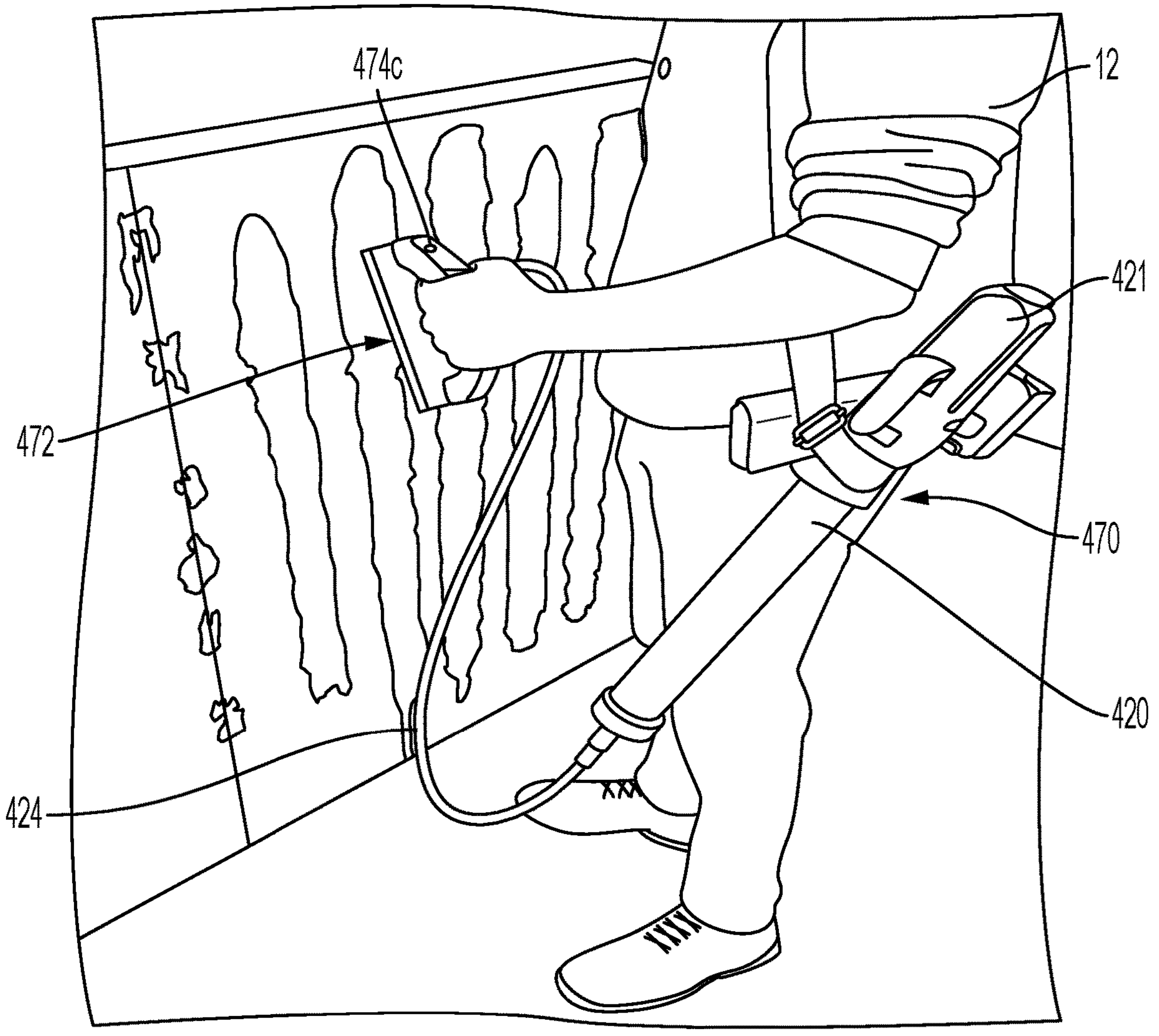
FIG. 1 is a perspective view of a sealant dispenser assembly in accordance with a further aspect of the present invention with a sealant dispensing trowel in accordance with the present invention.
Figure 2:
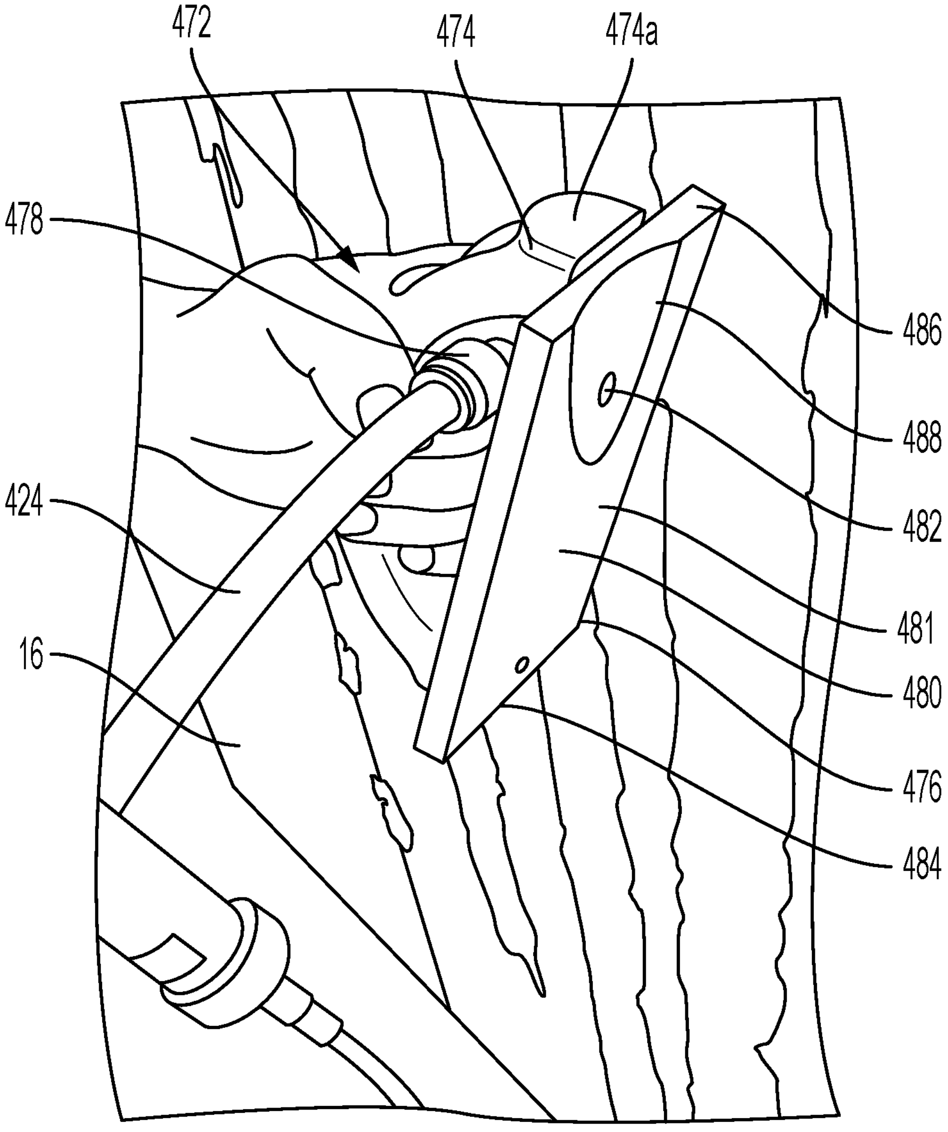
FIG. 2 is a lower side perspective view of the sealant dispensing trowel of FIG. 1.
Figure 3:
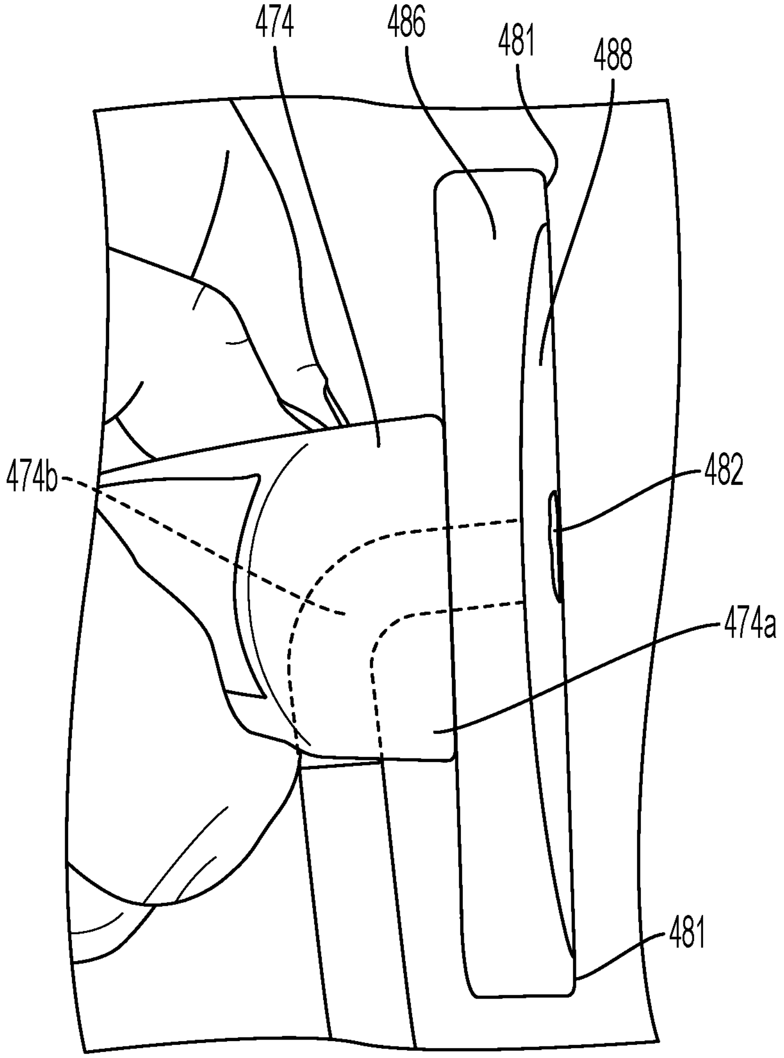
FIG. 3 is an end view of the sealant dispensing trowel of FIG. 1.

Referring now to the drawings and the illustrated embodiments depicted therein, as shown in FIGS. 1-4, a sealant dispenser system or assembly 470 is shown being used by an operator 12. System 470 includes a sealant dispensing canister 420 from which sealant is dispensed through sealant line 424 to a sealant dispensing trowel 472 held by the operator 12. Trowel 472 includes a trowel pad 476 that is removably affixed to handle 474, with trowel pad 476 including a trowel surface 480 having an opening 482 through which sealant is discharged for spreading via trowel 472. As understood from FIGS. 2 and 3 and discussed in more detail below, trowel pad 476 includes a leading end or edge 484 and a trailing end or edge 486, with trowel surface

480 including a curved or scalloped or dovetailed or fantailed shaped concave portion 488 that leads out to trailing edge 486.

In the embodiment shown, sealant is driven or pushed from the canister 420 via a battery drive 421 that applies pressure to a tube of sealant within canister 420. The battery drive 421 may force a plunger or piston into physical contact with the tube of sealant, such as via a screw drive or the like. Alternatively a pneumatic drive may be employed with canister 420 where air under pressure is supplied to canister 420 to force sealant from the tube of sealant through sealant line 424. FIG. 1 illustrates canister 420 as being supported by the operator 12 via a shoulder strap, but it should be understood that alternative carrying arrangements may be utilized, such as a back pack or hand held system.

As noted, sealant under pressure is supplied via sealant line 424 to trowel 472. Trowel 472, in turn, includes a handle 474 that is gripped by the operator 12 and a trowel block or pad 476 that is attached to a base 474*a* of handle 474. Sealant line 424 is connected to handle 474 via a fitting 478, with handle 474 including an internal channel or passage 474*b* through which sealant from line 424 is supplied to trowel pad 476. Fitting 478 may include a valve or a valve may be positioned within handle 474, with handle 474 in turn including a trigger or opening/closing switch 474*c* that may be activated by the operator 12 to allow sealant to flow into and through the handle 474. Alternatively, a separate or alternatively located switch may be employed to selectively allow and prevent sealant from flowing through trowel 472. For example, a switch to active the battery drive 421 or a pneumatic drive may be used for control of sealant flow through trowel 472, or a switch on sealant line 424 may be employed, or various other activation mechanisms and locations may be employed, where trowel 472 itself may or may not include its own or a separate activation switch.

Trowel pad 476 is removably affixed to handle 474, and in particular to base 474*a* of handle 474, such as via connectors 479, where the connectors 479 may be fasteners or may be snaps to enable the pad 476 to be snapped on by cooperating engagement portions or members between pad 476 and handle 474.

As noted, trowel pad 476 includes a trowel surface 480 opposite the side attached to handle 474, with trowel surface 480 including opening 482 that is aligned with the internal channel 474*b* in handle 474 whereby sealant that is discharged from line 424 flows through handle 474, into trowel pad 476 and out of opening 482. As understood from FIGS. 2 and 3, trowel pad 476 includes a leading end or edge 484 and a trailing end or edge 486, with trowel surface 480 including a generally flat portion 481 and including a curved or scalloped or dovetailed or fantailed shaped concave portion 488 that leads out to trailing edge 486, where in the illustrated embodiment the flat portion 481 surrounds concave portion 488.

Figure 4:
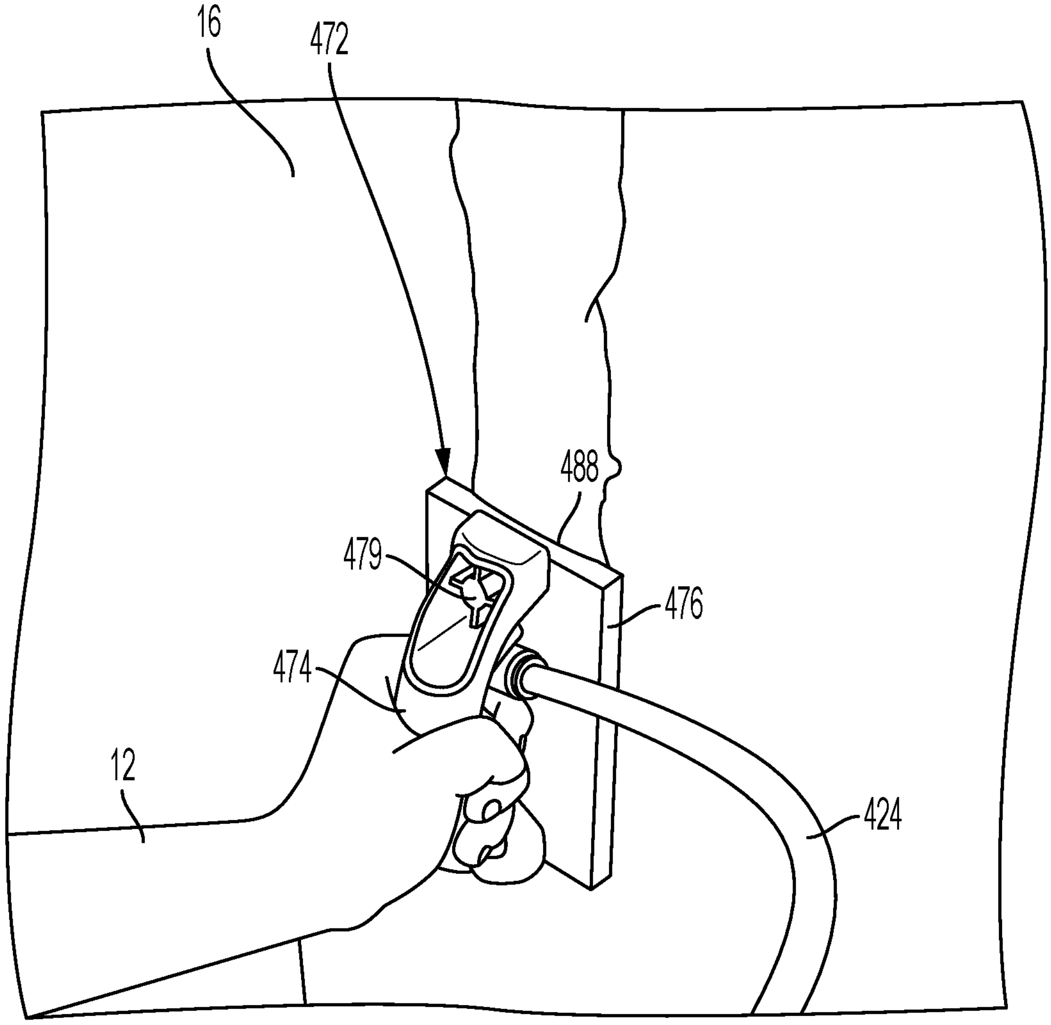
FIG. 4 is a perspective view of the sealant dispensing trowel of FIG. 1 shown in operation to apply sealant to a building surface.

In use, as understood from FIG. 4, operator 12 triggers sealant to flow from canister 420 through line 424 into handle 474 to trowel pad 476 while operator moves the trowel 472 along the building surface 16 to apply a sealant bead thereto. Concave portion 488 thus promotes an even bead thickness and width to be dispensed on the building surface or member 16 where, for example, the bead of sealant may be placed at a joint or seam of two members. It should be appreciated that the concave portion 488 in the illustrated embodiment is tapered from the generally flat portion 481 of trowel surface 480 adjacent the leading edge 484 to the deepest or largest concave portion opening at the trailing edge 486. It should be understood that the concave portion 488 ending at the trailing edge 486 will control the thickness of the bead of sealant applied to the building surface 16, as well as the width of the sealant bead. In use, the operator 12 is able to place the flat portion 481 against the building surface and move the trowel 472 there along while discharging sealant to generate a controlled and even sealant bead.

Figure 8A:
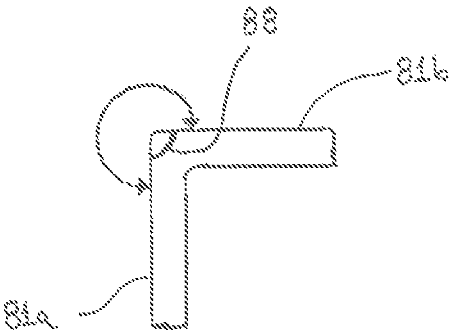
FIGS. 8A and 8B illustrate alternatively configured trowels for interior and exterior corners.
Figure 8B:
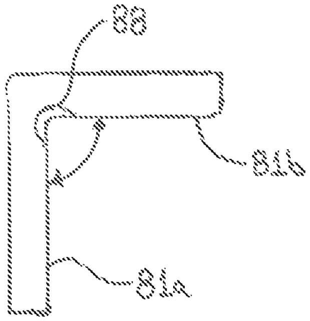

It should further be appreciated that alternatively configured and/or shaped trowel pads may be employed, such as with handle 474. For example, trowel pads for use in applying sealant to flat surfaces such as shown in FIG. 4 may be configured with alternatively sized concave portions 488, such as to create sealant beads that are wider or narrower, or result in sealant beads having different thicknesses, such as, for example, having thickness of 1 mm or 5 mm or 10 mm. Still further, trowel pads for use in applying sealant to angled surfaces may be employed. For example, alternative trowel pads for attachment to a handle, such as handle 474, may be configured for use on internal corners or outside corners, such as right angle corners or other angles. In such an arrangement the handle 474 may be affixed to the angled trowel pad having two surfaces whereby the internal channel of the handle 474 provides sealant to the angled trowel pad at an opening at the junction of the two surfaces of the trowel pad. For example, as illustrated in FIG. 8A such a trowel for use on an interior angle may have two trowel surfaces 81*a*, 81*b* that are disposed at right angles to each other and forming a 270 degree angle there between with concave portion 88 disposed where the trowel surfaces 81*a*, 81*b* meet, or as illustrated in FIG. 8B such a trowel for use on an exterior angle may have two trowel surfaces 81*a*, 81*b* that are disposed at right angles to each other and form a 90 degree angle there between with concave portion 88 disposed where the trowel surfaces 81*a*, 81*b* meet.

It should further be appreciated that trowel pads in accordance with the present invention may be disposable or consumable based on the removable nature of the trowel pad, with the handle 474 being a reusable or durable component of the assembly 470. For example, upon completion of a particular job, the trowel pad may be disposed of, such as due to the buildup of dried sealant thereon. Alternatively, the trowel pad may also be reusable.

Figure 5:
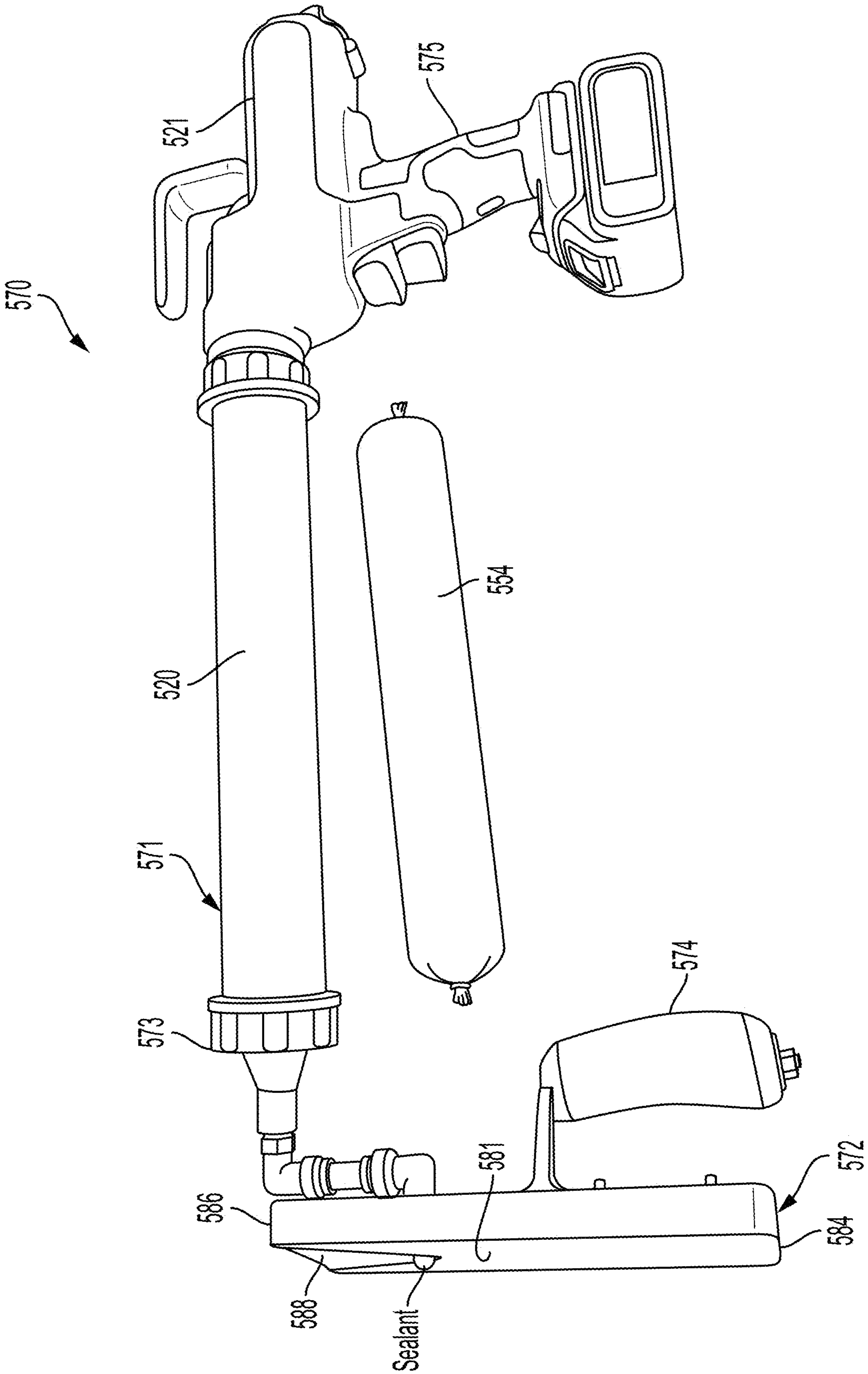
FIGS. 5-7 disclose a sealant dispenser assembly in accordance with aspects of the present invention with a sealant dispensing trowel.
Figure 6:
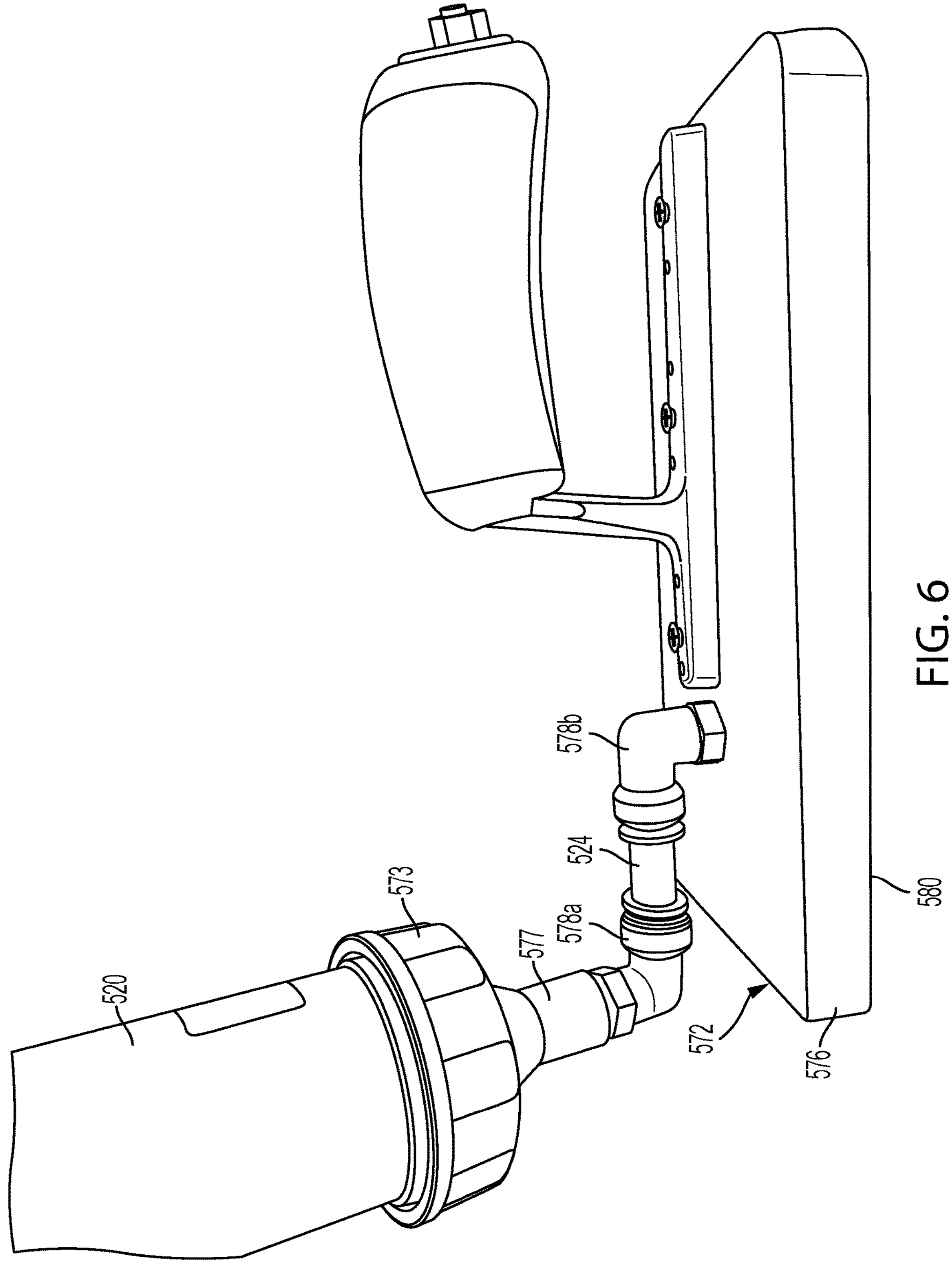
Figure 7:
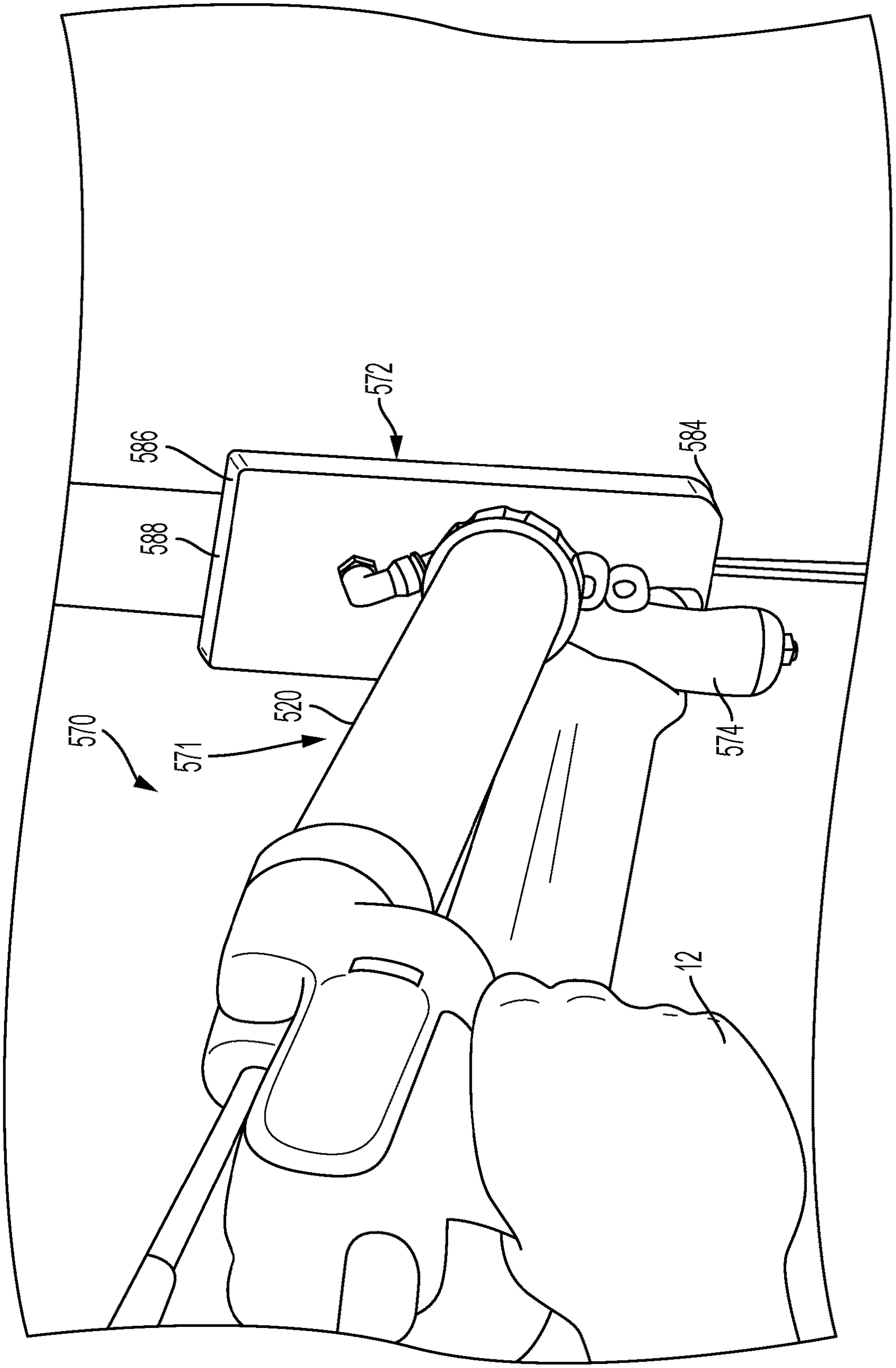

Referring now to the illustrated embodiment of FIGS. 5-7, an alternative sealant dispenser system or assembly 570 is shown that includes similar features to sealant dispenser system 470 discussed above, with in general like reference numerals being used on system 570 relative to that shown in system 470, but with “100” added to the features of system 570.

System 570 includes a caulk gun 571 having a sealant dispensing canister 520 from which sealant is dispensed through a sealant line 524 to a sealant dispensing trowel 572 held by the operator 12. In the embodiment shown, sealant is driven or pushed from the canister 520 via a handheld battery drive 521 that applies pressure to a tube of sealant 554 within canister 520. The battery drive 521 may force a plunger or piston into physical contact with the tube of sealant 554, such as via a screw drive, rack and pinion, or the like. Alternatively a pneumatic drive may be employed with canister 520 where air under pressure is supplied to canister 520 to force sealant from the tube of sealant 554 through sealant line 524. As understood from FIGS. 5 and 7, system 570 includes two handles by which operator 12 supports and uses system 570, where in the illustrated embodiment one handle 575 comprises a rearward or rear handle and is incorporated with battery drive 521 and the other handle 574 comprises a forward or front handle and is part of trowel 572. In the illustrated embodiment caulk gun 571 comprises a conventional powered caulk gun. It should be appreciated, however, that alternative arrangements may be employed, including a pneumatic or manual caulk gun. Still further, system 570 may be alternatively configured to include a rearward handle in an alternative location, such as not being part of a drive for the caulk gun.

As noted, sealant under pressure is supplied via sealant line 524 to trowel 572. In addition to handle 574, trowel 572 additionally includes a trowel block or pad 576. Sealant line 524 is connected to canister 520 of caulk gun 571 and trowel pad 576 via fittings, which in the illustrated embodiment comprise a pair of fittings 578*a*, 578*b* with trowel pad 576 including an internal channel or passage through which sealant from line 524 is supplied to the trowel surface 580. Fittings 578*a*, 578*b* are moveable and in particular are configured to enable rotational and pivotal movement, with fitting 578*a* being connected to tip 573 of canister 520 of caulk gun 571, and with fitting 578*b* being connected to trowel pad 576. The moveable fittings 578*a*, 578*b* enable system 570 to be used by an operator 12 with either their left or right hands in the forward position. For example, as shown in FIG. 7, the left hand of the operator is located on handle 574 with canister 520 pivoted to the right. Alternatively, via the moveable fittings, canister 520 could be pivoted to the left whereby the right hand of the operator is conveniently placed on handle 574. Although shown as incorporating two moveable fittings 578*a*, 578*b* connected with sealant line 524, it should be appreciated that alternative arrangements and configurations may be employed. For example, the forward opening or nozzle 577 of tip 573 could be directly joined to trowel pad 576 without sealant line 524. In such an embodiment, a moveable fitting could be provided between tip 573 and trowel pad 576 to allow pivoting movement of trowel 572 relative to caulk gun 571.

Trowel pad 576 is of substantially similar construction to trowel pad 476 discussed above such that not all of the like features are discussed herein. For example, trowel pad 576 is removably affixable to handle 574 and includes a trowel surface 580 opposite the handle 574 side, with trowel surface 580 including a curved or scalloped or dovetailed or fantailed shaped concave portion that leads out to a trailing edge 586 of the trowel pad 576. In like manner to system 470, and as previously discussed, system 570 provides a consistent amount and thickness of a bead of caulk for applying to a surface, with concave portion 588 promoting an even application thickness and width to be dispensed on the building surface or member 16 where, for example, the bead of sealant may be placed at a joint or seam of two members. It should be appreciated that the concave portion 588 in the illustrated embodiment is tapered from a generally flat portion 581 of trowel surface 580 adjacent the leading edge 584 to the deepest or largest concave portion opening at the trailing edge 586. It should be understood that the concave portion 588 ending at the trailing edge 586 will control the thickness of the bead of sealant applied to the building surface, as well as the width of the sealant bead.

Although system 570 is shown as including a handle 574 on trowel 572, it should be appreciated that system 570 may be employed with handle 574 being omitted as sealant in system 570 flows directly into and through trowel block 576. In such a configuration an operator may hold onto with one hand the elongated canister 520 of gun 571 that holds sealant 554, while the opposite hand holds the handheld battery drive 521.

In a further embodiment, a trowel may be provided in which the concave portion is adjustable in size, such as adjustable with respect to the width of the concave portion relative to the flat portion of the trowel surface and/or adjustable with respect to the depth of the concave portion, such as at the trailing edge. In such an embodiment the width and/or thickness of the sealant bead disposed on the building surface via the trowel would thus be adjustable, such as depending on installation guidelines provided by the sealant manufacturer. In this alternative embodiment, for example, the trowel is provided with a manual adjustment, such as a dial or lever, that enables the depth and/or width of the concave portion to be adjusted, or alternatively an adjustable wedge shaped piece may be provided that can be adjusted to alter the depth and/or width of the bead. The alternative solution to an adjustable recess trowel would be to offer multiple trowels with varying recess dimensions.

It should be appreciated that various alternatives may be employed. For example, rather than providing an operator activated switch on the trowel or sealant canister, the trowel may be provided with a contact activated switch that enables flow of sealant upon the trowel surface being placed in contact with the building surface. This may comprise, for example, a sensor or adaptor on the trowel such that, when the trowel surface is pressed against a building member, trowel automatically dispenses sealant material. Alternatively, sealant dispensing system may be mechanically actuated and include, for example, a bump fire trigger mechanism. A bump fire trigger mechanism may be sized and positioned so as to be triggered by being depressed when the trowel surface is placed against the building surface whereby sealant is dispensed. Still further, a push rod may be connected to the trowel so as to push against a trigger mechanism, such as a bump fire trigger mechanism, attached to the trowel or sealant canister. The trigger may also be voice-activated or electrically activated, such as with an electrical sensor. It should also be appreciated that the trowel pad may either be configured to be disposable and/or replaceable and/or reuseable. For example, the trowel pad may be removed and cleaned and replaced. Still further, the sealant canister may include an internal piston and an adjustable regulator to selectively adjust the air flow/pressure or power delivered to the internal piston. It is contemplated that the internal piston may be pneumatically driven (i.e., air-fed from a compressor), hand-cranked, hydraulically driven, electrically driven (i.e., electrically connected to an electrical source such as a battery or power cord or fuel cell operated, or operated by other alternative energy sources. As noted, sealant canister may include a shoulder sling so as to be conveniently worn by operator 12. Alternatively, such a shoulder sling can be re-configured or replaced with an attachment device enabling operator 12 to wear or carry a sealant canister on a construction waist belt. The attachment device may also be adaptable to secure sealant canister onto or inside a backpack worn by an operator. An operator may carry more than one such sealant canister.

Accordingly, the present invention provides various embodiments of sealant dispensing systems. In use, operators may use the sealing dispensing systems for sealing joining seams between building materials, for sealing around windows and other building portions, as well as fastener penetrations in the building material, such as in sheathing integrated with a weather resistive barrier, such as OSB/plywood, fiberglass gypsum sheathing, rigid foam insulation, or the like, such as to seal joints or seems at adjacent sheets of building material, or other penetrations or openings in the sheets of building material.

While the foregoing description describes several embodiments of the present invention, it will be understood by those skilled in the art that variations and modifications to these embodiments may be made without departing from the spirit and scope of the invention, as defined in the claims below. The present invention encompasses all combinations of various embodiments or aspects of the invention described herein. It is understood that any and all embodiments of the present invention may be taken in conjunction with any other embodiment to describe additional embodiments of the present invention. Furthermore, any elements of an embodiment may be combined with any and all other elements of any of the embodiments to describe additional embodiments. Changes and modifications in the specifically-described embodiments may be carried out without departing from the principles of the present invention, which is intended to be limited only by the scope of the appended claims as interpreted according to the principles of patent law including the doctrine of equivalents.

The embodiments of the invention in which an exclusive property or privilege is claimed are defined as follows:

1. A sealant dispensing system, said system comprising:

a sealant dispensing trowel, said trowel comprising a handle and a trowel pad;

wherein said trowel pad includes a trowel surface having an opening thereon through which sealant is configured to flow for applying to a building surface;

wherein said trowel pad includes a concave portion on said trowel surface, and wherein said trowel pad includes a leading edge and a trailing edge, and wherein said concave portion extends to said trailing edge, and wherein said opening on said trowel surface is disposed at said concave portion, and wherein said concave portion is narrower at said opening and wider at said trailing edge, and wherein said trowel surface includes a flat portion and said concave portion is recessed relative to said flat portion, and wherein said concave portion has a depth relative to said flat portion that is greater at said trailing edge than at said opening; and wherein said handle extends from said trowel opposite at least a portion of said flat portion of said trowel surface and is configured to be gripped by one hand of a user to press said trowel against a building surface.

2. The sealant dispensing system of claim 1, wherein said trowel pad is separable from said handle.

3. The sealant dispensing system of claim 1, wherein said trowel pad is configured for use on corners, and wherein said trowel surface comprises a pair of adjacently oriented surfaces.

4. The sealant dispensing system of claim 3, wherein said trowel pad is configured for use on an outside corner or an inside corner.

5. The sealant dispensing system of claim 1, wherein a sealant line supplies sealant to said trowel pad.

6. The sealant dispensing system of claim 1, wherein a sealant line supplies sealant to said handle with said handle including an internal channel for suppling sealant to said trowel pad.

7. The sealant dispensing system of claim 6, wherein said handle includes an activation switch that is selectively activated by an operator to allow sealant to flow to said trowel pad.

8. The sealant dispensing system of claim 1, further including a portable sealant canister configured to be carried by an operator, with a sealant line leading to said trowel, and wherein said sealant canister is operable to supply sealant to said trowel.

9. A sealant dispensing system, said system comprising:

a sealant dispensing trowel, said trowel comprising a block having a trowel pad and a front handle extending from said block and configured to be gripped by one hand of a user to press said trowel pad against a building surface;

a caulk gun, said caulk gun comprising an elongate canister configured to hold sealant and a hand held drive coupled to said canister, wherein said hand held drive is configured to selectively dispense sealant from said canister, and wherein said caulk gun is coupled to said trowel with said caulk gun configured to deliver sealant from said canister to said trowel, and wherein said hand held drive comprises a rear handle configured to be gripped by the other hand of the user;

a sealant line between said caulk gun and said trowel through which sealant is delivered from said caulk gun to said trowel;

wherein said trowel pad includes a trowel surface having an opening thereon through which sealant is configured to flow for applying to a building surface; and wherein said caulk gun is movably coupled to said trowel such that said caulk gun and said trowel are moveable relative to each other.

10. The sealant dispensing system of claim 9, wherein said trowel pad includes a concave portion on said trowel surface, and wherein said trowel pad includes a leading edge and a trailing edge and said concave portion extends to said trailing edge, and wherein said opening on said trowel surface is disposed at said concave portion.

11. The sealant dispensing system of claim 10, wherein said concave portion is narrower at said opening and wider at said trailing edge, and wherein said trowel surface includes a flat portion and said concave portion is recessed relative to said flat portion, and wherein said concave portion has a depth relative to said flat portion that is greater at said trailing edge than at said opening.

12. The sealant dispensing system of claim 9, wherein said caulk gun is coupled to said trowel by a fitting at said sealant line, wherein said fitting is moveable whereby said caulk gun is moveable relative to said trowel.

13. The sealant dispensing system of claim 12, wherein said fitting comprises a pair of moveable fittings with one of said fittings joined to said caulk gun and the other said fitting joined to said trowel with said sealant line being disposed between said fittings.

14. The sealant dispensing system of claim 9, wherein sealant-said from said caulk gun is supplied through said trowel pad.

15. The sealant dispensing system of claim 9, wherein said front handle extends from said block opposite said trowel surface.

16. The sealant dispensing system of claim 15, wherein said trowel surface comprises a planar portion and wherein said front handle is disposed at least partially opposite said planar portion.

17. The sealant dispensing system of claim 9, wherein said hand held drive comprises a powered drive unit configured to force sealant out of said caulk gun through said sealant line.

18. The sealant dispensing system of claim 17, wherein said hand held drive comprises a battery drive unit.

19. The sealant dispensing system of claim 9, wherein said trowel pad is unitarily formed with said block.

* * * * *